(12) United States Patent
Kang

(10) Patent No.: US 6,226,921 B1
(45) Date of Patent: May 8, 2001

(54) SELF-WATERING PLANTER

(75) Inventor: Bang Sung Kang, Alpharetta, GA (US)

(73) Assignee: Gaasbeck U.S.A., Inc., Duluth, GA (US)

(*) Notice: Subject to any disclaimer, the term of this patent is extended or adjusted under 35 U.S.C. 154(b) by 0 days.

(21) Appl. No.: 09/253,846

(22) Filed: Feb. 22, 1999

(51) Int. Cl.$^7$ .................................................. A01G 25/00
(52) U.S. Cl. ............................................................. 47/81
(58) Field of Search .......................... 47/41.01, 59, 66, 47/71, 79, 80, 81, 82, 84, 85

(56) References Cited

U.S. PATENT DOCUMENTS

| 2,695,474 | * | 11/1954 | Barstow | 47/81 |
|---|---|---|---|---|
| 3,261,125 | * | 7/1966 | Arkebauer | 47/81 |
| 3,739,524 | * | 6/1973 | Rose | 47/81 |
| 4,052,818 | * | 10/1977 | Hagerty | 47/81 |
| 4,067,143 | | 1/1978 | Alwell . | |
| 4,171,593 | | 10/1979 | Bigglestone . | |
| 4,236,352 | | 12/1980 | Heaney et al. . | |
| 4,329,815 | | 5/1982 | Secrest . | |
| 4,420,904 | * | 12/1983 | Joswig et al. | 47/81 |
| 4,527,354 | * | 7/1985 | Sellier | 47/81 |
| 4,538,378 | * | 9/1985 | Roige | 47/72 |
| 4,962,613 | | 10/1990 | Nalbandian . | |
| 4,991,346 | | 2/1991 | Costa, Jr. et al. . | |
| 4,996,792 | | 3/1991 | Holtkamp, Sr. . | |
| 5,046,282 | | 9/1991 | Whitaker . | |
| 5,099,609 | * | 3/1992 | Yamauchi | 47/81 |
| 5,111,614 | | 5/1992 | Holtkamp, Sr. . | |
| 5,477,640 | | 12/1995 | Holtkamp, Jr. . | |
| 5,491,929 | | 2/1996 | Peacock et al. . | |
| 5,535,542 | * | 7/1996 | Gardner et al. | 47/18 |
| 5,644,868 | | 7/1997 | Lui . | |
| 5,704,162 | | 1/1998 | Holtkamp, Jr. . | |
| 5,782,035 | | 7/1998 | Locke et al. . | |

* cited by examiner

Primary Examiner—Charles T. Jordan
Assistant Examiner—Francis T. Palo
(74) Attorney, Agent, or Firm—Hinkle & Associates, P.C.

(57) ABSTRACT

A plant watering device for use in conjunction with a planting container (10) having an enclosed water reservoir (15) at the lower portion of the planter and having a water fill tube (27) communicating with the water reservoir extending to the area of the planter rim (12). A water level indicating mechanism (36) is provided to communicate the water reservoir level of the planter to the user in order to determine the level of water in the reservoir. The water level indicator comprises a float (42) in the water reservoir having a stem (43) extending upwardly through a hollow tube to indicate the water level. Capillary wicking material (17, 46) is provided to wick water from the water (26) reservoir to planting media within the planter.

8 Claims, 3 Drawing Sheets

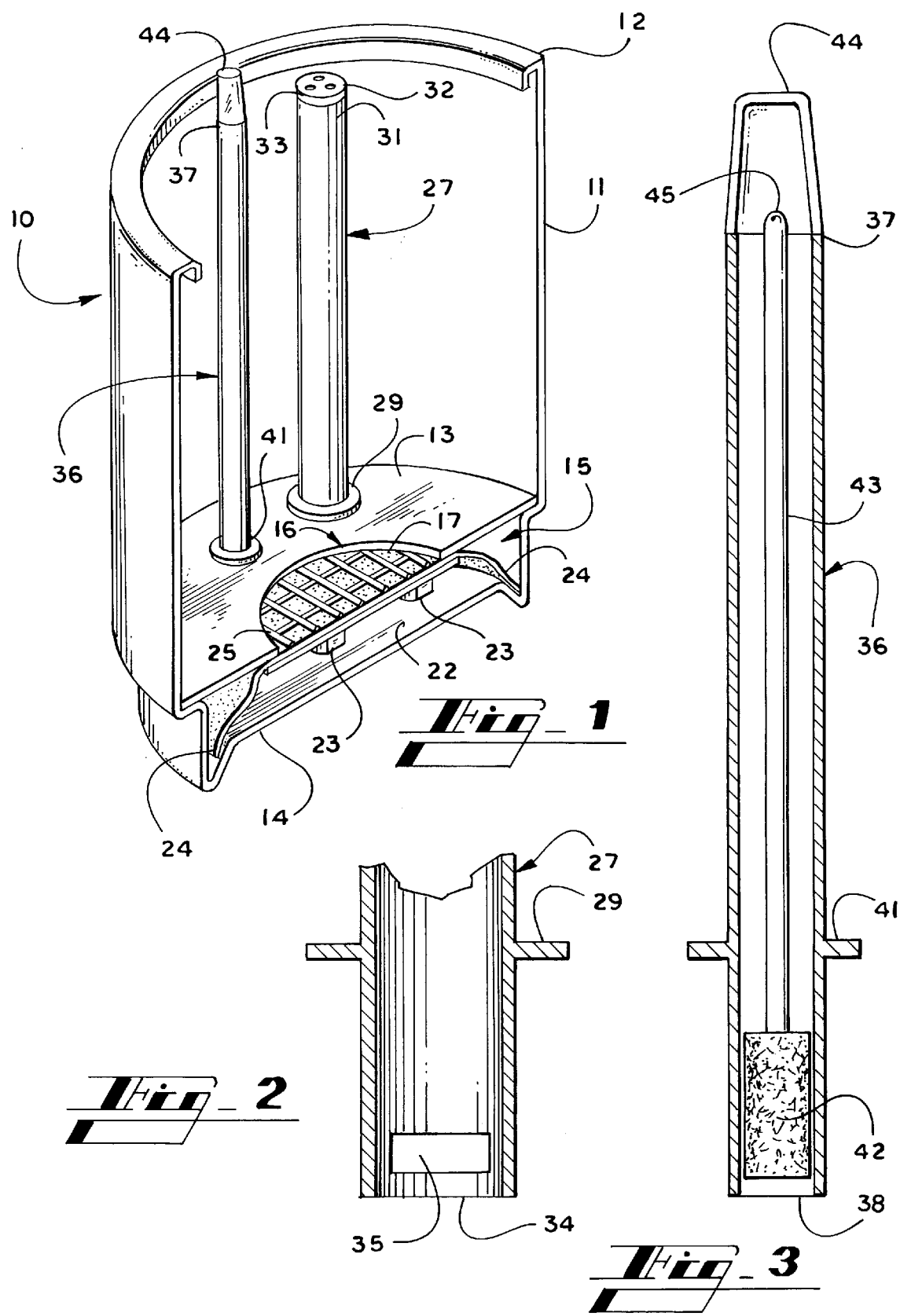

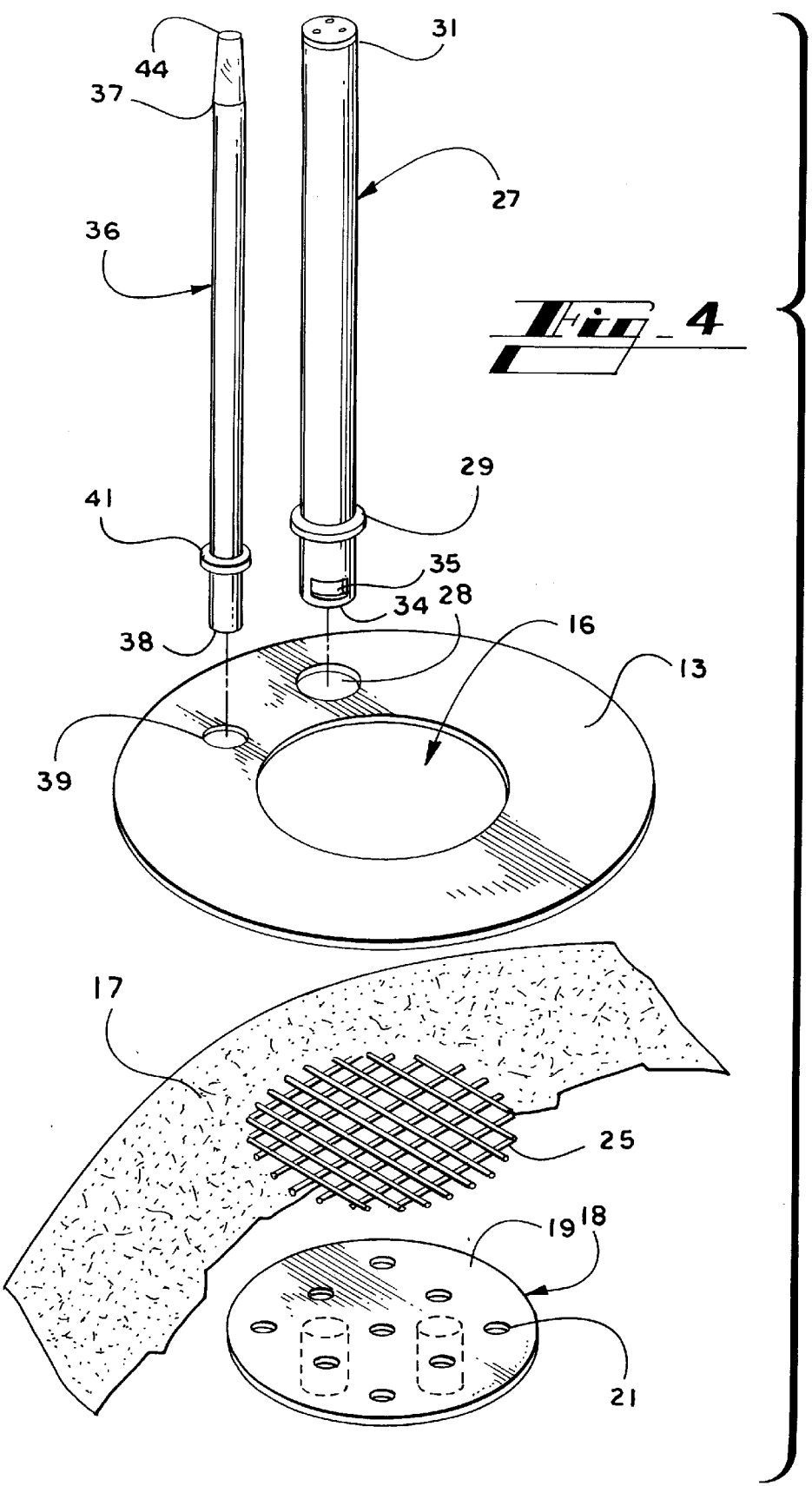

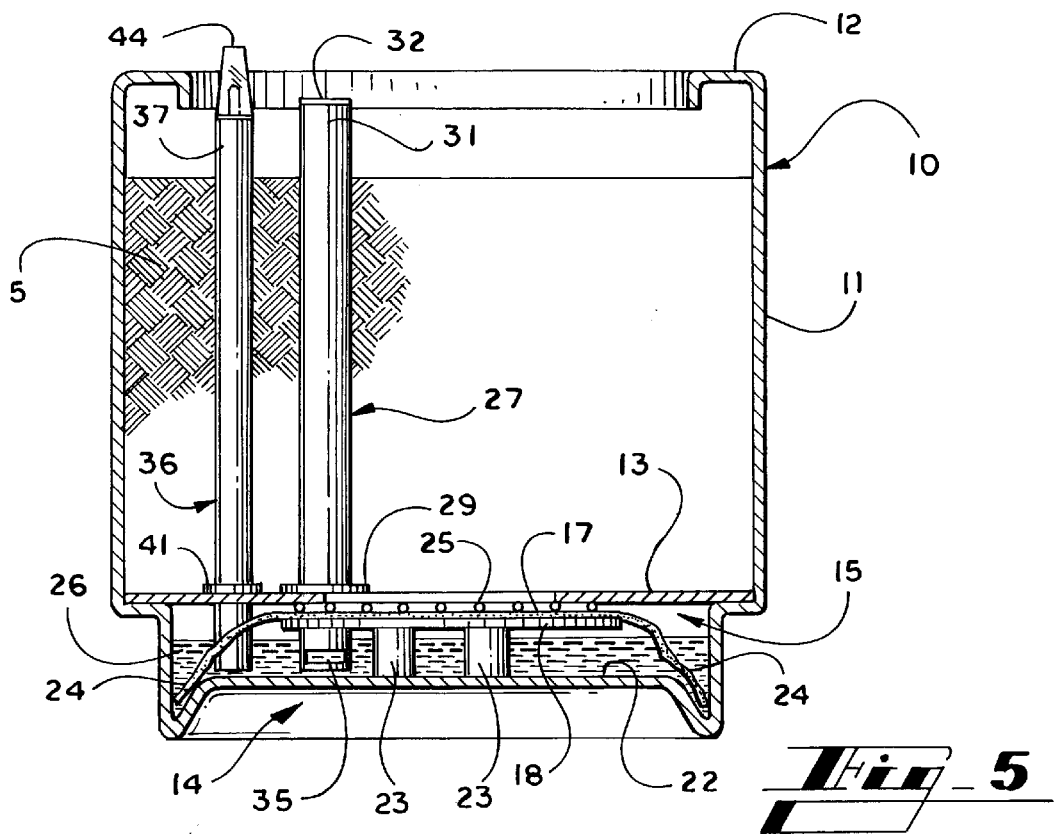
Fig_5
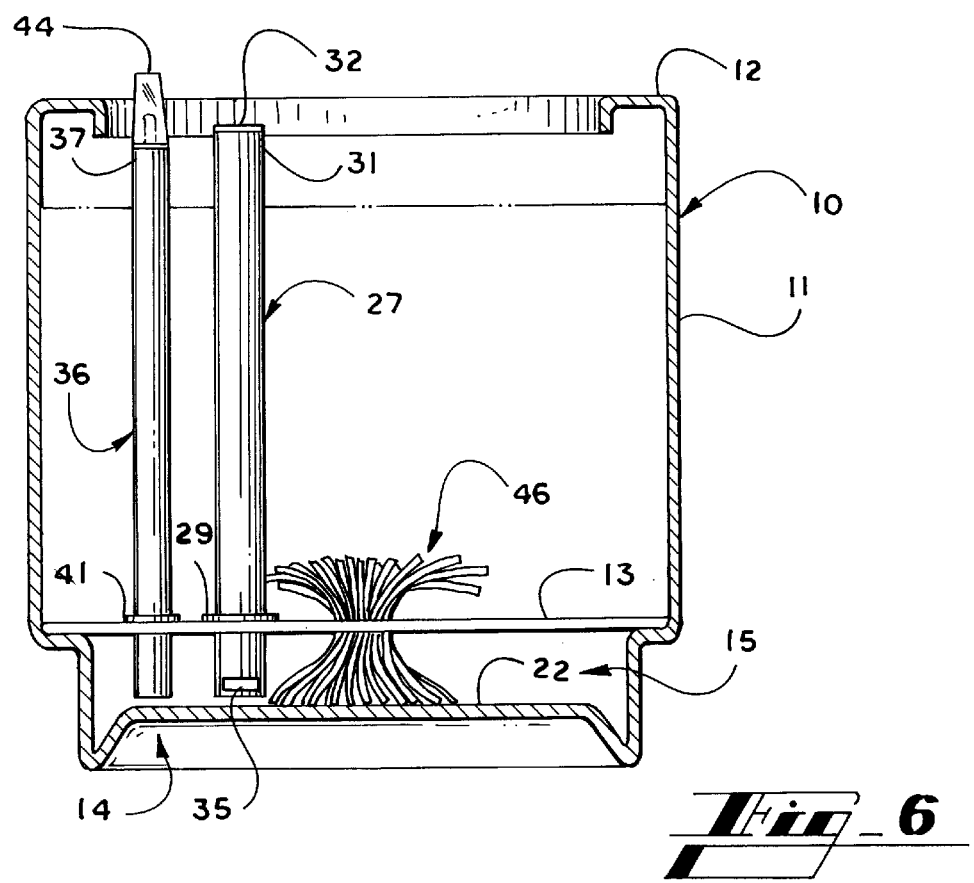
Fig_6

SELF-WATERING PLANTER

BACKGROUND OF THE INVENTION

I. Field of the Invention

The present invention relates generally to the field of self-watering planters and, more particularly, to planting containers for growing live plants which have an integral reservoir for water and a system for wicking the water from the reservoir to the plant media, and having a water level indicator for determining the level of water within the reservoir.

II. Description of the Related Art

The prior art shows many types of planters which are self-watering in some respects, and others which have water level indicating devices, and others which sense the amount of moisture in the pot. However, a combination of these important aspects has not been found in the prior art such as the present invention provides.

SUMMARY OF THE INVENTION

In accordance with the present invention and the contemplated problems which have and continue to exist in this field, the present invention overcomes the previous problems with self-watering planters by providing a planter in various sizes and which contains an integral water reservoir along with a mechanism for self-watering. In addition, there is an internal mechanism for permitting an easy determination of the water level. The planter of the present invention reduces the time required for care of potted plants and permits the owner to take extended trips without concern for the plants, or without having the plants cared for by another source during the owners absence.

The self-watering mechanism also provides the plant in the planter with healthier soil conditions and enhances the health and growth of the plant. The self-watering mechanism of the present invention generally consists of a tube extending above the soil level for filling the water reservoir in the bottom of the planter, and the tube also permits air entry into the water tank. In addition, there is a tube extending above the soil level, which is in communication with the reservoir, having an indication metering device to easily determine the level of water in the water reservoir. The soil media in which the plant grows is in communication with a hydrophilic wicking mechanism having capillary properties to slowly diffuse the water from the reservoir into the growing media. The amount of water diffused into the soil is regulated by the amount and length of the wicking material.

The present planter will be made available in various sizes and will be made of various materials such as plastic, ceramic, clay, bamboo, wood, brass or other suitable materials.

Other objects, advantages and capabilities of the invention will become apparent from the following description taken in conjunction with the accompanying drawings showing the preferred embodiment of the invention.

BRIEF DESCRIPTION OF THE DRAWINGS

FIG. 1 is a perspective view of a vertical section of the planter of the present invention;

FIG. 2 is a vertical section of the lower portion of the water fill tube;

FIG. 3 is a vertical section of the water level indicator mechanism;

FIG. 4 is an exploded perspective view of the lower portion of the planter showing the wicking apparatus of the first embodiment and the reservoir mechanisms;

FIG. 5 is a vertical section view of the planter; and

FIG. 6 is a vertical section view of the planter showing a second embodiment of the wicking apparatus.

DESCRIPTION OF THE PREFERRED EMBODIMENTS

For a fuller understanding of the nature and desired objects of this invention, reference should be made to the following detailed description taken in connection with the accompanying drawings. Referring to the drawings wherein like reference numerals designate corresponding parts throughout the several figures, reference is made first to FIG. 1. The self-watering planter of the present invention is indicated by numeral 10 which generally comprises a cylindrical container having a side wall 11, an upper rim 12, a planter bottom plate 13 providing a plant growing area therebetween and a concave bottom area 14. Between the concave bottom area 14 and the planter bottom plate 13 is a hollow area which comprises the water reservoir 15.

As can be seen in FIGS. 1 and 4, the bottom plate 13 has a central aperture 16 for communicating the planting media, shown by numeral 20 in FIG. 5, with the water reservoir 15. In order to allow communication of water from the reservoir 15 to the planting media through the aperture 16, wicking netting material 17 is provided. In the embodiment shown in FIGS. 1, 4 and 5, the wicking material is a geotextile material which has wicking capillary action to transmit moisture from the water reservoir to the planting media 20 which will be in contact with the wicking material 17. In this particular embodiment, the geotextile material is a netting which is supported by the netting support member 18 which, in turn, comprises a planar surface 19 having a plurality of drainage holes 21. The support member 18 is placed at the bottom upper surface 22 of the water reservoir 15 and supported thereon by feet 23 affixed to the underside of the support member.

As easily seen in FIGS. 1 and 5, the netting material is supported on the planar surface 19 and is of sufficient size that the trailing edges 24 of the netting material dip into the water reservoir for the purpose of wicking the water into the geotextile netting material 17 and providing moisture to the planting media 20. To provide additional support to the netting material on its upper surface, there is provided a protective, rigid support member 25 which may be of suitable material to prevent excessive planting media from excessively mixing with the geotextile netting 17. As shown in FIG. 1, the rigid support 25 is of cross-hatched configuration, but the material obviously may be of any type of fine mesh screening material which would suitably maintain the netting material 17 in a flattened condition and also to keep excessive amounts of planting media from intermixing with the media. To operate the wicking action, the media needs to be juxtaposed to the netting material but not necessarily mixed therein to effect the proper wicking action to transfer the water 26 from the reservoir 15 to the planting media.

Inasmuch as the water reservoir is in the bottom of the planter, a suitable mechanism for effecting filling of the reservoir is the water filled tube 27 which is mounted in the planter bottom plate 13 through a suitable receiving aperture 28. Mounting flange 29 maintains the water fill tube 27 to the planter bottom plate 13, and, if desired, may be adhesively connected thereto. Although, this should not be necessary and it may well be that the water fill tube 27 should be left removably attached to the bottom plate 13 for cleaning and other purposes. The water fill tube has an upper area 31 by which the water reservoir may be filled with water from the top. Once the water is poured into the upper area 31 of the tube 27, a cap 32 is placed thereon and will typically have a plurality of holes 33 to allow air to be communicated to the water fill tube 27, and ultimately to aerate the water reservoir 15 through the lower end 34 and through the aeration aperture 35.

An important aspect of the present invention is a reservoir level indicating means 36 which comprises a cylindrical tube having an upper end 37 and a lower end 38. The indicator 36 is mounted to the planter bottom plate 13 through receiving aperture 39, and the bottom open end 38 extends into communication with the water reservoir 15. As with the water fill tube 27, the water level indicator tube 36 mounts to the planter bottom plate 13 by means of mounting flange 41.

To measure the level of water in the water reservoir, the water level indicator 36 has a flotation member 42 attached to the lower end of a level indicating rod 43. The indicating rod 43 projects substantially the entire distance of the length of the indicating tube 36 and into the upper end 37. As seen in FIG. 3, the upper end 37 of the tube 36 comprises a closed transparent cover through which the top 45 of the rod 43 is visible. By observing where the top 45 is positioned within the transparent cover 44, one may visually determine the level of water in the reservoir. For instance, if the float 42 is resting on the planter bottom plate 13, the top 45 of rod 43 would be very near the lower portion of the transparent cover 44 indicating that the water level in the reservoir is empty. Conversely, if the top 45 of the rod 43 is at the upper portion of the transparent cover 44, this would indicate that the water level in the reservoir is at a full condition. For convenience sake, level graduations may be placed on the transparent cover 44 to indicate different water levels between empty and full. These graduations are not shown in the present drawings.

In an alternative embodiment of the invention shown in FIG. 6, it may be desirable to have an alternate wicking system to that shown as netting 17 and dispense with the netting support member 18 and the rigid support 25. In such a case, a geotextile string-like wicking material 46 having capillary properties would be placed within a suitable sized aperture 16 in the bottom plate 13, which material would be in contact with the water 26 in the reservoir 15 to transmit, by capillary action, moisture to the planting media. The string-like wicking material 46 would have a extension above the bottom plate 13 a suitable amount to transmit moisture from the reservoir to the planting media. However, in all other aspects, the string-like wicking material 46 operates the same as the geotextile netting material 17.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A pot for growing plants comprising:
   the pot having an upper end, a plant growing area and a lower end,
   the lower end of the pot having a bottom member and an upper closure plate positioned with respect to the bottom member defining an enclosed water reservoir,
   the upper closure plate having a first aperture therein for communication of the plant growing area of the pot with the reservoir,
   a hydrophilic wick juxtaposed to the first aperture in the upper closure plate for drawing water from the water reservoir to the first aperture in the upper closure plate,
   a water filler tube extending from the upper end of the pot to the water reservoir and being in open communication therewith,
   the filler tube having a selectively open upper end for filling with water and having an open lower end in communication with the water reservoir,
   a water level indicator extending from the upper end of the pot to the water reservoir and being in open communication therewith,
   a support member positioned between the bottom member and the upper closure plate, the support member having an upper surface and a lower surface, at least one positioning foot depending from the lower surface of the support member and engaging the bottom member to maintain the support member distanced from the bottom member, and
   the hydrophilic wick being juxtaposed between the upper surface of the support member and a lower surface of the upper closure plate.

2. A pot for growing plants as claimed in claim 1, the wick comprising a substantially flat flexible material having edges extending into the water reservoir.

3. A pot for growing plants as claimed in claim 1, further comprising an aerating chamber located in the lower end of the filler tube and in the water reservoir.

4. A pot for growing plants as claimed in claim 3, the upper closure plate having a second aperture therein through which the filler tube is positioned, an annular mounting flange mounted on the filler tube, the mounting flange being placed in supported relationship with the upper closure plate.

5. A pot for growing plants as claimed in claim 1, wherein the water level indicator is an elongated tube having a closed upper end and an open lower end, which lower end in is communication with the water reservoir, the closed upper end being of transparent material.

6. A pot for growing plants as claimed in claim 5 comprising a float means located within the water level indicator tube and having an elongated rod affixed thereto, the elongated tube having an upper end position within the closed upper end of the water level indicator tube, the float means and the affixed elongated rod being free to float within the water reservoir.

7. A pot for growing plants as claimed in claim 6, wherein the upper closure plate has a third aperture therein through which the filler tube is positioned, an annular flange mounted on the filler tube, the mounting flange being placed in supported relationship with the upper closure plate.

8. A pot for growing plants comprising:
   the pot having an upper end, a plant growing area and a lower end,
   the lower end of the pot having a bottom member and an upper closure plate positioned with respect to the bottom member defining an enclosed water reservoir,
   the upper closure plate having a first aperture therein for communication of the plant growing area of the pot with the water reservoir,
   a support member positioned between the bottom member and the upper closure plate,
   the support member having an upper surface and a lower surface, at least one positioning foot depending from the lower surface of the support member and engaging the bottom to maintain the support member distanced from the bottom member, a hydrophilic wick juxtaposed to the first aperture in the upper closure plate for drawing water from the water reservoir to the first aperture in the upper closure plate, the hydrophilic wick being placed between the upper surface of the support member and a lower surface of the upper closure plate, a water filler tube extending from the upper end of the pot to the water reservoir and being in communication therewith, the filler tube having a selectively open upper end for filling with water and having an open lower end in communication with the water reservoir, an aerating chamber located in the lower end of the filler tube and in the water reservoir, the upper closure plate having a second aperture therein through which the filler tube is positioned, an annular mounting flange mounted on the filler tube, the mounting flange being placed in supported relationship with the upper closure plate, and a water level indicator extending from the upper end of the pot to the water reservoir and being in open communication therewith.

\* \* \* \* \*